(12) United States Patent
Scheib et al.

(10) Patent No.: US 6,189,655 B1
(45) Date of Patent: Feb. 20, 2001

(54) TRANSMISSION HOUSING WITH INTEGRAL LUBRICATION SYSTEM

(75) Inventors: Patrick L. Scheib, Pinehurst; Peggy M. Garrett, Laurinburg; Kenneth T. Picone, Pinehurst, all of NC (US)

(73) Assignee: ZF Meritor L.L.C., Maxton, NC (US)

( * ) Notice: Under 35 U.S.C. 154(b), the term of this patent shall be extended for 0 days.

(21) Appl. No.: 09/344,171

(22) Filed: Jun. 24, 1999

(51) Int. Cl.$^7$ ................................................. F16H 57/04
(52) U.S. Cl. .................... 184/6.12; 74/467; 74/606 R; 192/219
(58) Field of Search ................... 184/6.12, 6.28; 74/606 R, 467; 164/34; 192/219

(56) References Cited

U.S. PATENT DOCUMENTS

| | | |
|---|---|---|
| 1,429,466 | 9/1922 | Turnbull . |
| 2,077,580 | 4/1937 | Patterson . |
| 2,263,092 | 11/1941 | Johnson . |
| 3,046,807 | 7/1962 | Barth . |
| 3,407,741 | 10/1968 | Weber et al. . |
| 3,550,724 | 12/1970 | Vollmer . |
| 3,719,253 | 3/1973 | Dukes et al. . |
| 3,788,167 * | 1/1974 | Beaudoin et al. ............... 192/219 X |
| 4,356,889 | 11/1982 | Teeter . |
| 4,429,587 | 2/1984 | Finn et al. . |
| 4,658,665 * | 4/1987 | Strinzel et al. ........................ 74/467 |
| 4,712,442 | 12/1987 | Balka et al. . |
| 4,896,561 * | 1/1990 | Hayakawa et al. ................. 74/606 R |
| 5,158,152 * | 10/1992 | Nemoto et al. ..................... 184/6.12 |
| 5,279,391 | 1/1994 | Ward . |
| 5,351,664 * | 10/1994 | Rotter et al. ................... 184/104.3 X |
| 5,372,176 * | 12/1994 | Brown et al. ........................... 164/34 |
| 5,522,476 | 6/1996 | Holman . |
| 5,524,696 * | 6/1996 | Osborne et al. ....................... 164/34 |
| 5,544,540 | 8/1996 | Holman . |
| 5,595,235 * | 1/1997 | Anselm et al. .................... 164/34 X |
| 5,878,632 * | 3/1999 | Hubler et al. ...................... 74/606 R |
| 5,901,802 * | 5/1999 | Sunohara et al. ............... 184/6.12 X |
| 5,979,271 * | 11/1999 | Louis et al. ........................ 74/606 R |
| 5,988,344 * | 11/1999 | Allen ................................ 192/219 X |

FOREIGN PATENT DOCUMENTS 489983    1/1953   (CA) .

* cited by examiner

*Primary Examiner*—Rodney H. Bonck
(74) *Attorney, Agent, or Firm*—Carlson, Gaskey & Olds

(57) ABSTRACT

A transmission having an integral lubrication (stem for delivering lubrication fluid to transmission components is provided. The lubrication system has a housing with a sump portion for holding the fluid. The lubrication system also includes a pump assembly with inlet and outlet chambers wherein the pump assembly moves the fluid from the inlet chamber to the outlet chamber. The housing has a collection system with an inlet passageway which interconnects the inlet chamber and the sump to provide fluid communication between them. The housing has a distribution system with a plurality of fluid distribution ports for delivering the fluid to the transmission components. The distribution system interconnects said distribution ports and said outlet chamber to provide fluid communication between them. First, second, and third passageways are integrally formed within various portions of the housing and deliver the fluid to bearing portions of the shafts and to the transmission gears.

7 Claims, 8 Drawing Sheets

TRANSMISSION HOUSING WITH INTEGRAL LUBRICATION SYSTEM

RELATED APPLICATION

This disclosure is filed with Applicants' copending application having the Ser. No. No. 09/339,752, filed concurrently herewith and entitled "Transmission Housing with Integral Pump Assembly." Each application is directed to different inventions.

BACKGROUND OF THE INVENTION

This invention relates to a transmission housing, or more specifically, to a transmission housing having an integrally formed lubrication system.

Transmissions have lubrication systems that circulate lubricating fluid within the transmission housing to various transmission components to reduce the friction of those components and lower the temperature of the transmission. The lubrication system may be discussed in terms of three main portions: the collection system, the distribution system, and the pump which draws fluid from the collection system and moves it through the distribution system.

Typically, the collection and distribution systems utilize external tubing connected to the pump to carry the oil throughout the transmission. For example, an inlet tube may be submersed in a sump portion, which holds the oil, so that oil may be drawn from the sump and distributed to the transmission components. The tubing must be packaged around the transmission components within the housing. Further, the tubing must be secured to the housing to prevent any movement during transmission operation. One example is a distribution tube that extends though a hole in a wall within the housing over the gears. Using, many separate components adds cost to the transmission and poses design problems. Therefore, what is needed is oil passages integral with the transmission housing so that components may be eliminated while still achieving a robust design.

SUMMARY OFF THE INVENTION AND ADVANTAGES

The present invention provides a transmission having an integral lubrication system for delivering lubrication fluid to transmission components. The lubrication system has a housing with a sump portion for holding the fluid. The lubrication system also includes a pump assembly with inlet and outlet chambers wherein the pump assembly moves the fluid from the inlet chamber to the outlet chamber. The housing has a collection system with an inlet passageway which interconnects the inlet chamber and the sump to provide fluid communication between them. The housing has a distribution system with a plurality of fluid distribution ports for delivering the fluid to the transmission components. The distribution system interconnects said distribution ports and said outlet chamber to provide fluid communication between them. First, second, and third passageways are integrally formed within various portions of the housing and deliver the fluid to bearing portions of the shafts and to the transmission gears.

Accordingly, the above described invention provides a lubrication system that eliminates the external tubing of the prior art.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
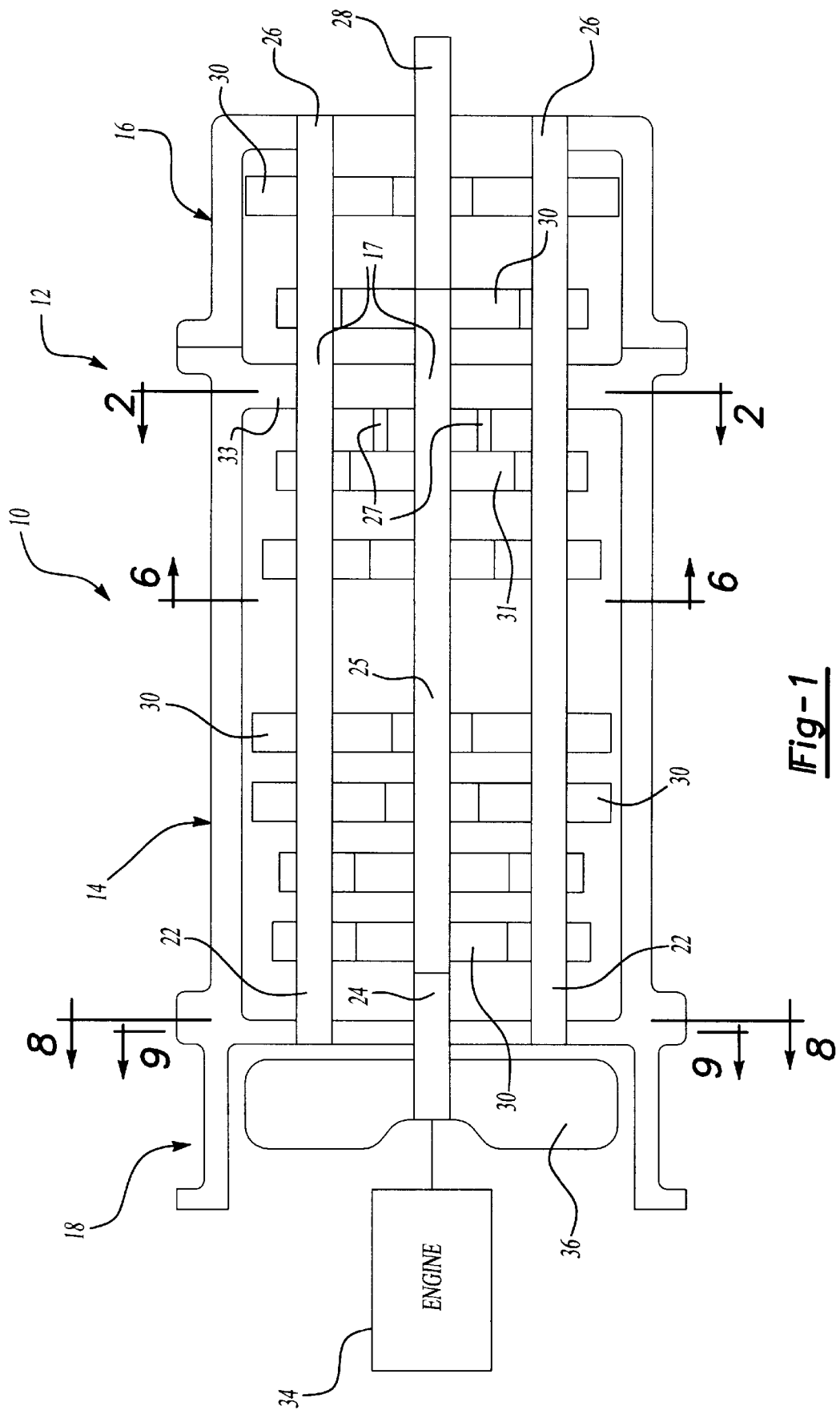
FIG. 1 is a schematic view of a cross-section of a manual transmission for a heavy vehicle.

Referring to FIG. 1, a transmission 10 for a heavy vehicle has a housing 12. The housing 12 has three sections: a main box 14, an auxiliary box 16, and a clutch housing 18. A plurality of shafts 22,24,25,26,27,28 having a plurality of gears 30 are supported within the main 14 and auxiliary 16 boxes. More specifically, the main box 14 has main countershafts 22, an input shaft 24, and a main shaft 25. It also has reverse idler shafts 27 that support reverse idler gears 31. The auxiliary box 16 has auxiliary countershafts 26 and an output shaft 28. While the auxiliary box is shown with only two gear sets, the auxiliary section could also be a combined range and splitter box. An intermediate wall 33 separates the main 14 and auxiliary 16 boxes and supports portions 17 of the shafts 22,25,26,27.

Together, the shafts 22,25,26,27,28 and gears 30,31 cooperate to multiply speed from the engine 34 to achieve a desired gear ratio. The clutch housing 18 has a clutch 36 interconnecting the input shaft 24 and the engine 34 to selectively couple and decouple the engine 34 and transmission 10 together.

Figure 2:
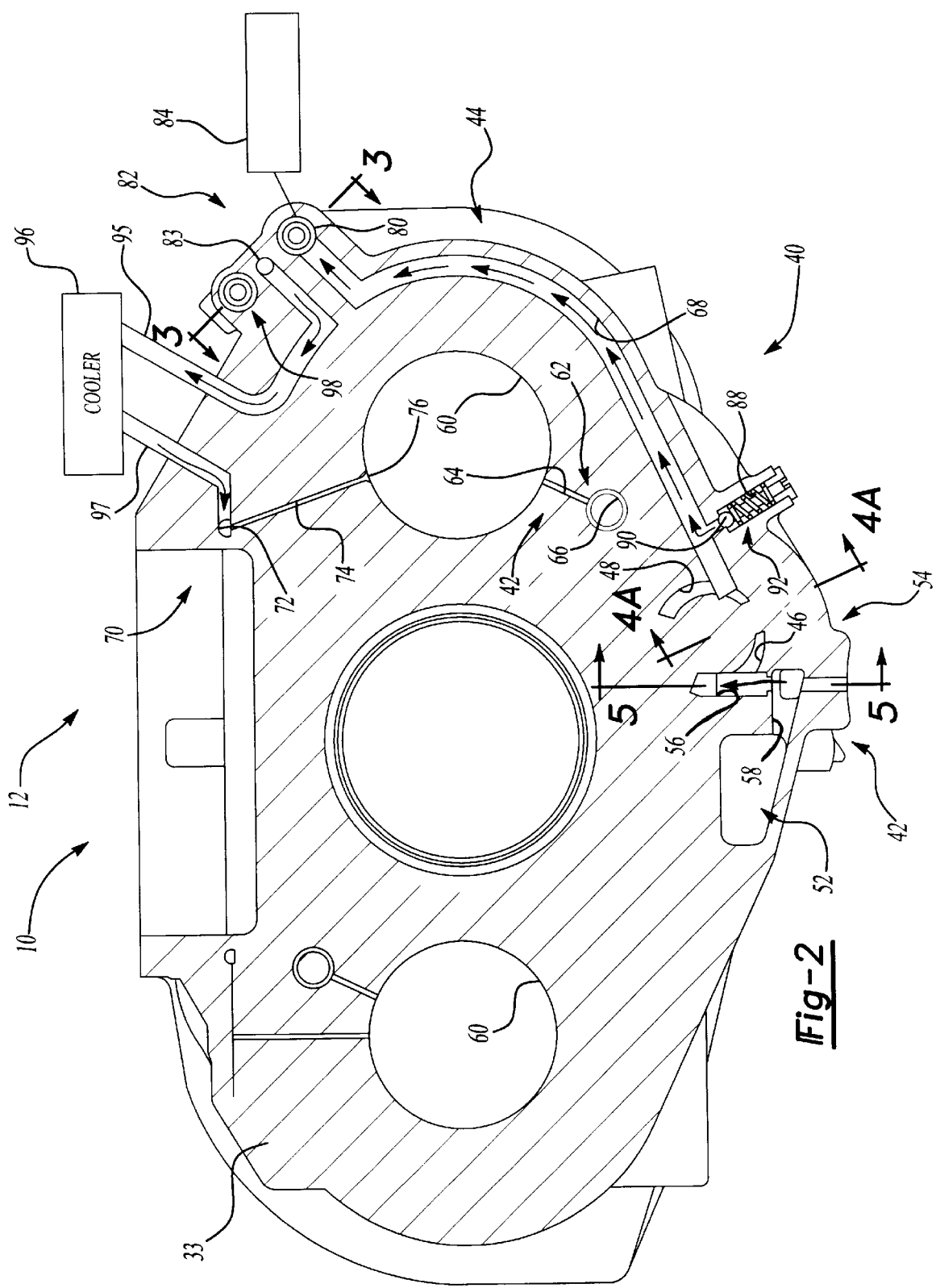
FIG. 2 is a cross-sectional view taken along line 2—2 in FIG. 1 showing the intermediate wall of present invention.

Because the shafts 22,25,26,27,28 and gears 30,31 rotate under load, they generate friction and heat. As a result, transmissions incorporate lubrication systems for delivering lubricating fluid, or oil, to various transmission components to reduce friction and dissipate the heat. Referring now to FIG. 2, the intermediate wall 33 has a portion of a lubrication system 40 of the present invention integrally formed between opposing surfaces. The lubrication system 40 has a collection system 42 and a distribution system 44 to circulate the oil throughout the transmission 10. The collection system 42 collects the oil after it has been used to lubricate and cool the transmission components. The distribution system 44 carries the oil from the collection system 42 back to the transmission components. A pump assembly 50 (shown in FIG. 4A) draws the oil from the collection system 42 from an inlet port 46 and expels it out an outlet port 48 to move the oil through the distribution system 44.

With continuing reference to FIG. 2, the collection system 42 has a sump 52 defined by a lower portion 54 of the housing 12 which collects the oil that drains back from the transmission components. An inlet passageway 56 is integrally and internally formed within the intermediate wall 33 and interconnects the sump 52 and the inlet port 46 to provide fluid communication between them. That is, when the term integrally or internally is used it is meant that the passageway has a component that is generally parallel to the opposing surfaces of a portion of the housing. Said another way, the passageway is not simply a hole extending through the housing from one surface to the opposing surface. The inlet passageway 56 includes a plurality of branches 58 that are connected to different portions of the sump 52 so that oil from different areas of the transmission may be drawn into the inlet passageway 56 to be distributed by the pump assembly 50.

As mentioned above, the shafts 22,25,26,27 have bearing portions 17 supported by the housing 12. Intermediate wall 33 has bores 60 that support the bearing portions 17 so that the shafts 22,25,26,27 may rotate within the bores 60. The collection system 42 further includes a return passageway 62, at least a portion of which is integrally formed within the intermediate wall 33. The reverse idler shaft bore 62 has a connecting tube 64 that intersects the bore 60 and a hole 66 that extends through the intermediate wall 33.

The distribution system 44 has a plurality of fluid distribution ports for delivering the fluid to a plurality of transmission components, such as the bearing portion 17. For convenience sake, the distribution system 44 may be discussed in terms of segments, or passageways and is in no way intended to limit the scope of the invention. The distribution system 44 has a main feed passageway 68, or first passageway, integrally formed within the intermediate wall 33. The main feed passageway 68 interconnects the outlet port 48 and the rest of the distribution system 44 to provide fluid communication between the pump assembly 50 and the transmission components that require oil.

The distribution system 44 has a second passageway 72, a portion of which runs generally parallel with the shafts 22,24,25,26,27,28 in an upper portion 70 of the housing 12. The second passageway 72 carries the oil from the first passageway 68 in the intermediate wall 33 to other components throughout the transmission 10. A third passageway 74 interconnects the second passageway 72 and the bores 60. A distribution port 76 is formed where the third passageway 74 intersects the bores 60 for delivering the oil to the bearing portions 17.

The inlet 56, first 68, second 72, and third 74 passageways are contiguous and integrally formed within portions of the housing 12 during a lost foam casting process. As part of this process, a foam pattern is made which corresponds to the desired shape of the housing 12. The pattern is placed in a mold and completely covered with sand or another suitable material so that the sand penetrates all the cavities within the pattern. Thus, during the casting process the passageways 68,72,74 are filled with sand. Molten aluminum is then poured into the mold thereby evaporating the foam pattern. The resulting aluminum housing is removed from the mold and all the sand shaken out.

Although the passageways 56,68,72,74 of the collection 42 and distribution 44 systems are shown integrally formed, it is to be understood that not all portions need be integrally formed within the housing 12. That is, an ordinary worker will appreciate that only portions of the collection 42 and distribution 44 systems may be integrally formed to come within the scope of the present invention. Said another way, tubes or some other external fluid carrying device may be used in conjunction with the integrally formed passageways to carry the oil to a portion of the transmission. Moreover, any combination of integrally formed passageways located within the intermediate wall 33, but may be located anywhere within the housing 12, such as the auxiliary box 16 or clutch housing 18.

The distribution system 44 includes several pressure control devices which regulate the oil pressure within the system. One such device is a solenoid 80 located within a boss 82 on the housing 12. The solenoid 80 is used to slow the rotating transmission components by increasing the load placed on them, as disclosed in Ser. No. 08/931,379 entitled "Fluid Power Transmission Clutch Brake." This is accomplished by increasing the load on the pump assembly 50, which is coupled to the main shaft 24 through the reverse idler gear 31 (shown in FIG. 4A).

The solenoid 80 is disposed within the first passageway 68 between the outlet port 48 and the distribution ports that carry the oil to the transmission components, such as distribution port 76. The solenoid 80 has a normally open and closed position in which the first passageway 68 is unobstructed and blocked by the solenoid 80, respectively. When the solenoid is in the normally open position, the oil exits the control boss through control boss passageway 83 and continues to flow along the second passageway 72.

A clutch signal 84 is connected to the solenoid 80 for preparing the transmission to change between gears 30,31. The clutch signal 84 actuates the solenoid 80 to the closed position which blocks the first passageway 68 and increases the pressure on the pump assembly 50 and the load on the gears 30,31. In this manner, the rotating transmission components are slowed in preparation for a gear shift.

A first pressure relief bore 88 is connected to the first passageway 68 so that they are in fluid communication with one another. The first pressure relief bore 88 is positioned between the solenoid 80 and the outlet port 48. The first pressure relief bore 88 has a first venting orifice 90 that is in fluid communication with the sump 52. A first pressure relief valve 92, which may be a ball check valve, is disposed within the first pressure relief bore 88. The first pressure relief valve 92 has a normally closed position and an open position in which the first venting orifice 90 is blocked and unobstructed, respectively. The first pressure relief valve 92 works in conjunction with the solenoid 80 so that if an undesirably high pressure is reached the first pressure relief valves 92 moves to the open position thereby permitting the oil to escape through the first venting orifice 90 and back to the sump 52.

An oil cooler 96 may be added to the lubrication system 40 to reduce the oil temperature, and thus, the temperature of the transmission components. The oil cooler 96 may be located along the first passageway 68 between the solenoid 80 and the distribution ports and connected by a supply 95 and return 97 line.

When a solenoid is used, the second relief is necessary to protect the cooler and distribution system. A second pressure relief valve 98, or check ball valve, may be connected to the first passageway 68 in the boss 82, best shown in FIG. 3.

Figure 3:
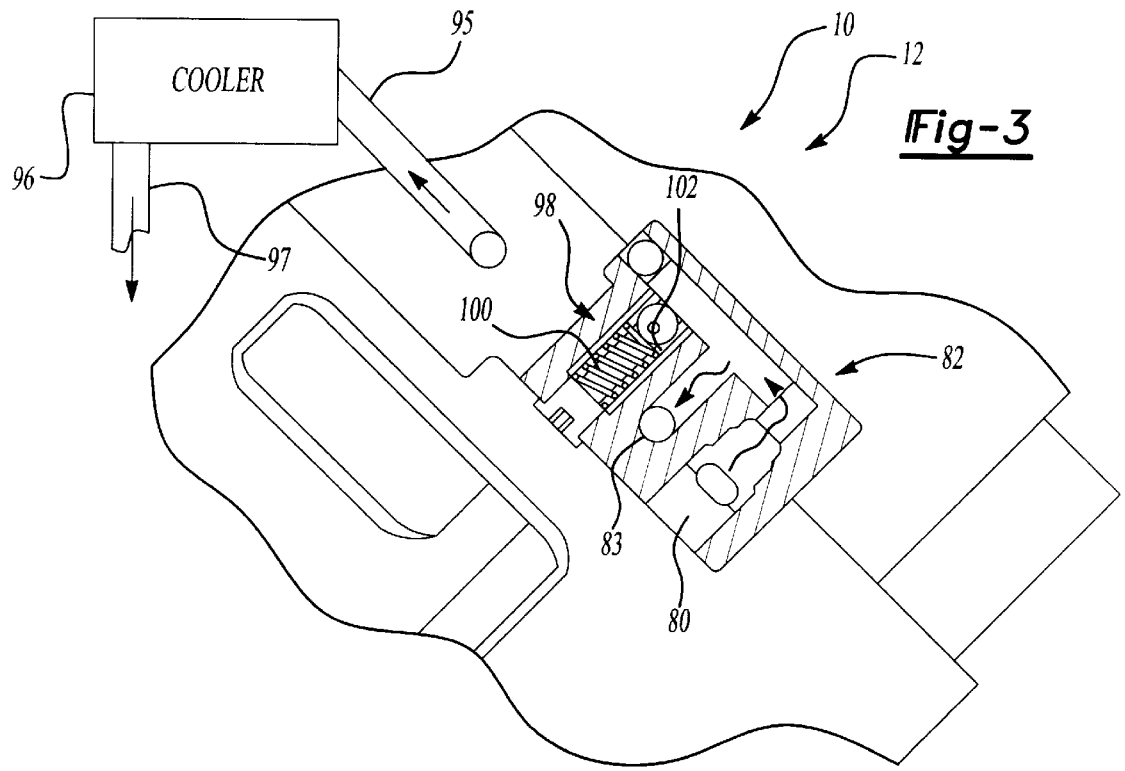
FIG. 3 is a partial cross-sectional view taken along line 3—3 in FIG. 2.

Referring to FIG. 3, a second pressure relief bore 100 is positioned between the solenoid 80 and the oil cooler 96.

The second pressure relief bore 100 has a second venting orifice 102 in fluid communication with the sump 52. The second pressure relief valve 98 has a normally closed position and an open position in which the second venting orifice 102 is blocked and unobstructed, respectively. The second pressure relief valve 98 moves to the open position when the oil reaches a predetermined pressure to protect the distribution system 44. With the second pressure relief valve 98 open, the oil is permitted to escape through the second venting orifice 102 and back to the sump 52. The second pressure relief valve 98 is set to vent at a lower pressure than the first pressure relief valve 92.

It is to be understood that relief valves, solenoid, and oil cooler may be arranged differently than described above, or any one of them may be omitted from a particular lubrication distribution system. For example, the oil cooler may be eliminated if an acceptable oil temperature may be achieved without it, or the clutch solenoid may be eliminated if desired. Further, the above-described components may be located elsewhere on the housing.

Figure 4A:
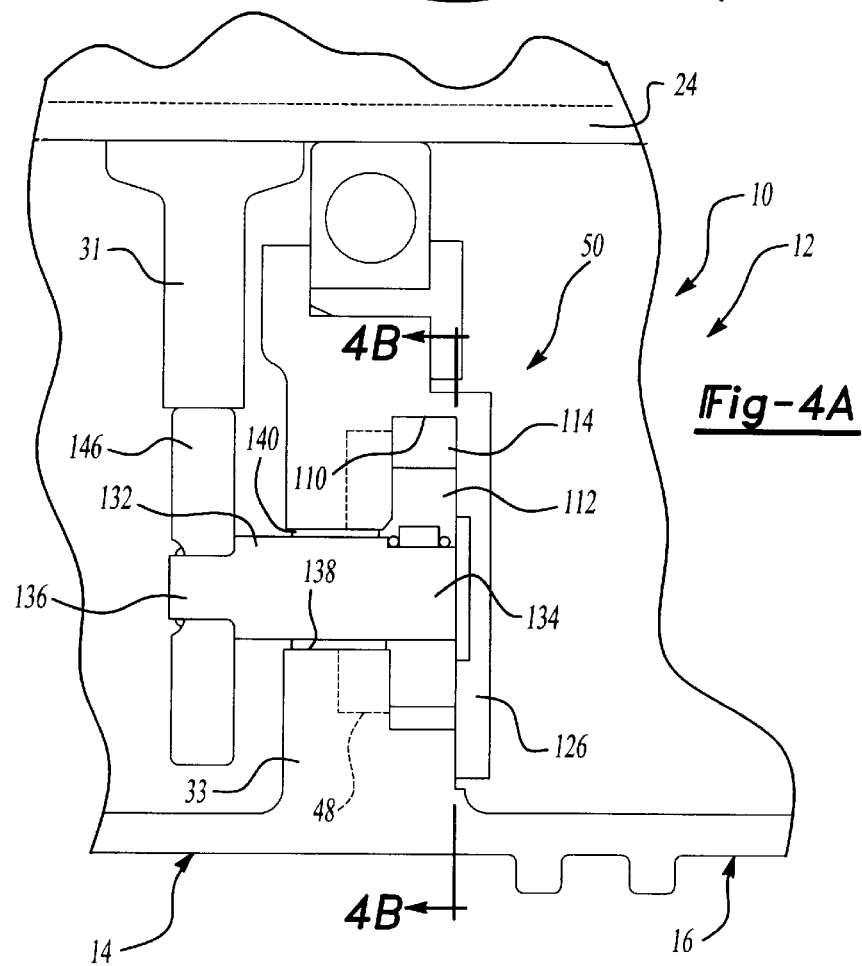
FIG. 4A is a partial cross-sectional view taken along line 4A—4A in FIG. 2 showing the pump assembly of the present invention.
Figure 4B:
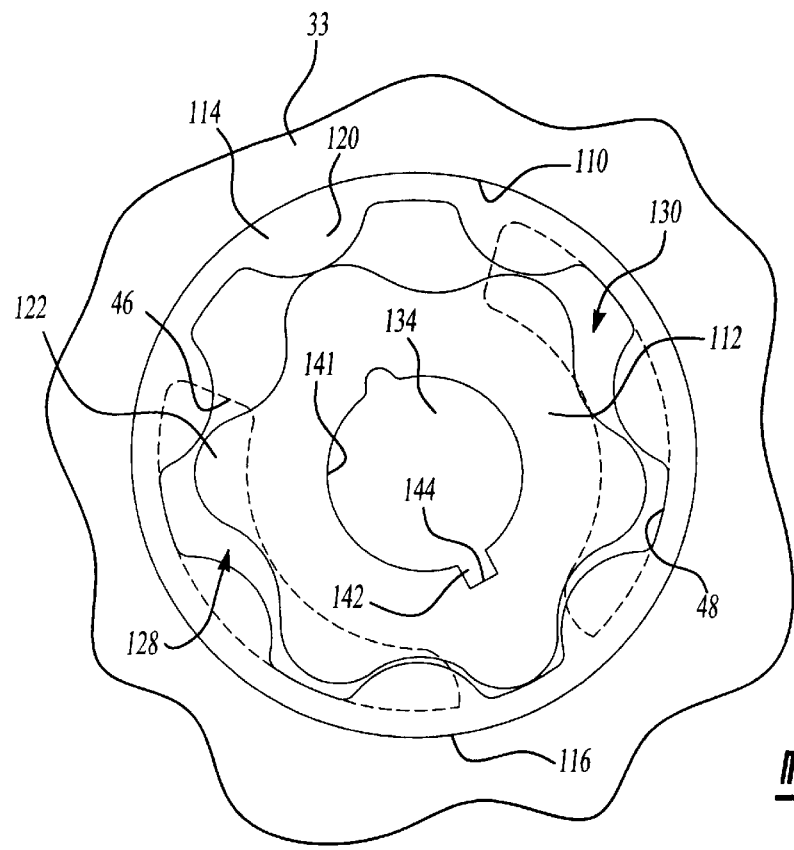
FIG. 4B is a partial cross-sectional view taken along line 4B—4B in FIG. 3A showing the pump assembly of the present invention.

Turning to FIGS. 4A and 4B, the pump assembly 50 is housed in the intermediate wall 33, which eliminates the need for a separate pump housing typically used in the prior art. The intermediate wall 33 has an opening 110 that is in fluid communication with the inlet 46 and outlet 48 ports. The inlet 46 and outlet 48 ports and the opening 110 are rough cast into the intermediate wall 33. At least one pumping member, or more specifically, an inner 112 and outer 114 rotor, is dispose within the opening 110 for moving the oil from the inlet port 46 to the outlet port 48.

Referring to FIG. 4B, the outer rotor 114 has an outer cylindrical surface 116 adjacent a perimeter of the opening 110. The outer rotor 114 has a plurality of radially inwardly extending teeth 120 and the inner rotor 112 is disposed within the outer rotor 114. The inner rotor 112 has a plurality of radially outwardly extending teeth 122 that mesh with the plurality of radially inwardly extending teeth 120 so that the inner 112 and outer 114 rotors rotate together. A pump cover 126 is attached to the intermediate wall 33 over the opening 110 and the inner 112 and outer 114 rotors. An inlet 128 and outlet 130 chamber is defined within the opening 110 by the pump cover 126 and space between the inlet 112 and outlet 114 rotors.

The pump assembly 50 has a pump shaft 132 with first 134 and second 136 ends. A bore 138 in intermediate wall 33 supports the pump shaft 132, and a bushing 140 is received within the bore 138. The first end 134 is received within a hole 141 in the inner rotor 112 and coupled thereto using an interlocking key 142 and notch 144. The second end 136 is coupled to a pump gear 146 that is, in turn, coupled to a gear, such as the reverse idler gear 31. As the gear 31 rotates, the inner 112 and outer 114 rotors are driven, which draws the oil from the inlet port 46 into the inlet chamber 128 and then expels the oil into the outlet chamber 130 and to the outlet port 48.

Figure 5:
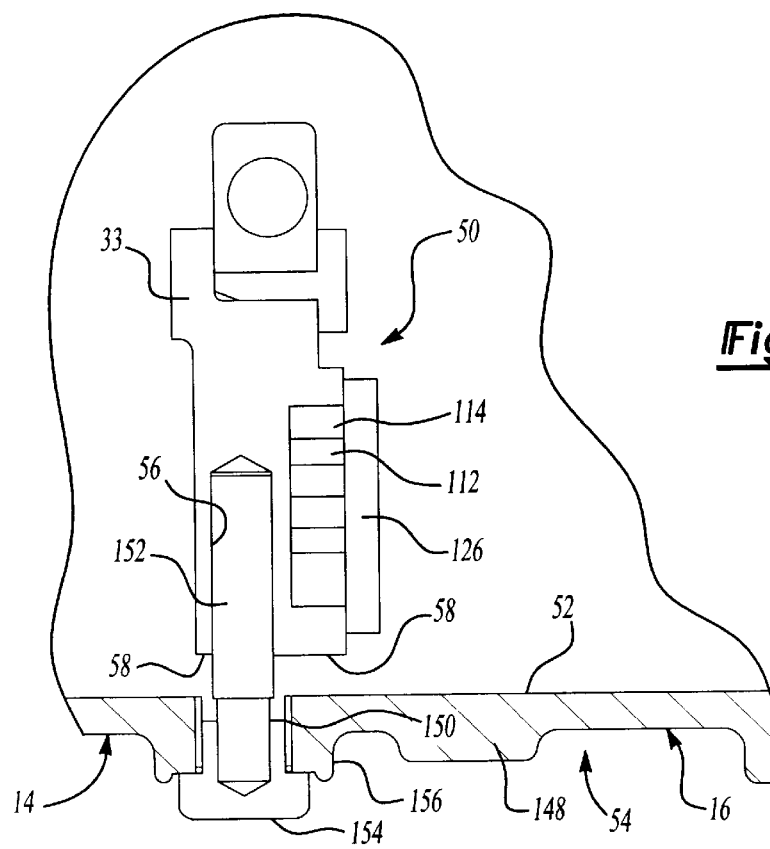
FIG. 5 is a partial cross-sectional view taken along line 5—5 in FIG. 2 showing the pump assembly of the present invention.

Referring to FIG. 5, the housing has an outer wall 148 with the intermediate wall 33 extending interiorly at an angle from it. The outer wall 148 has a hole 150 extending into the intermediate wall 33 which intersects the inlet passageway 56. A filter 152 is disposed within the hole 150 between said sump 52 and inlet chamber 128 for filtering the oil as it moves from the sump 52 through the plurality of branches 58 to the inlet passageway 56. A removable plug 154 is disposed within the hole 150 at an exterior surface 156 of the outer wall 148 for preventing the oil from leaking from the housing 12 and providing access to the filter 152. The filter 152 may or may not be connected directly to the plug 154.

Figure 6:
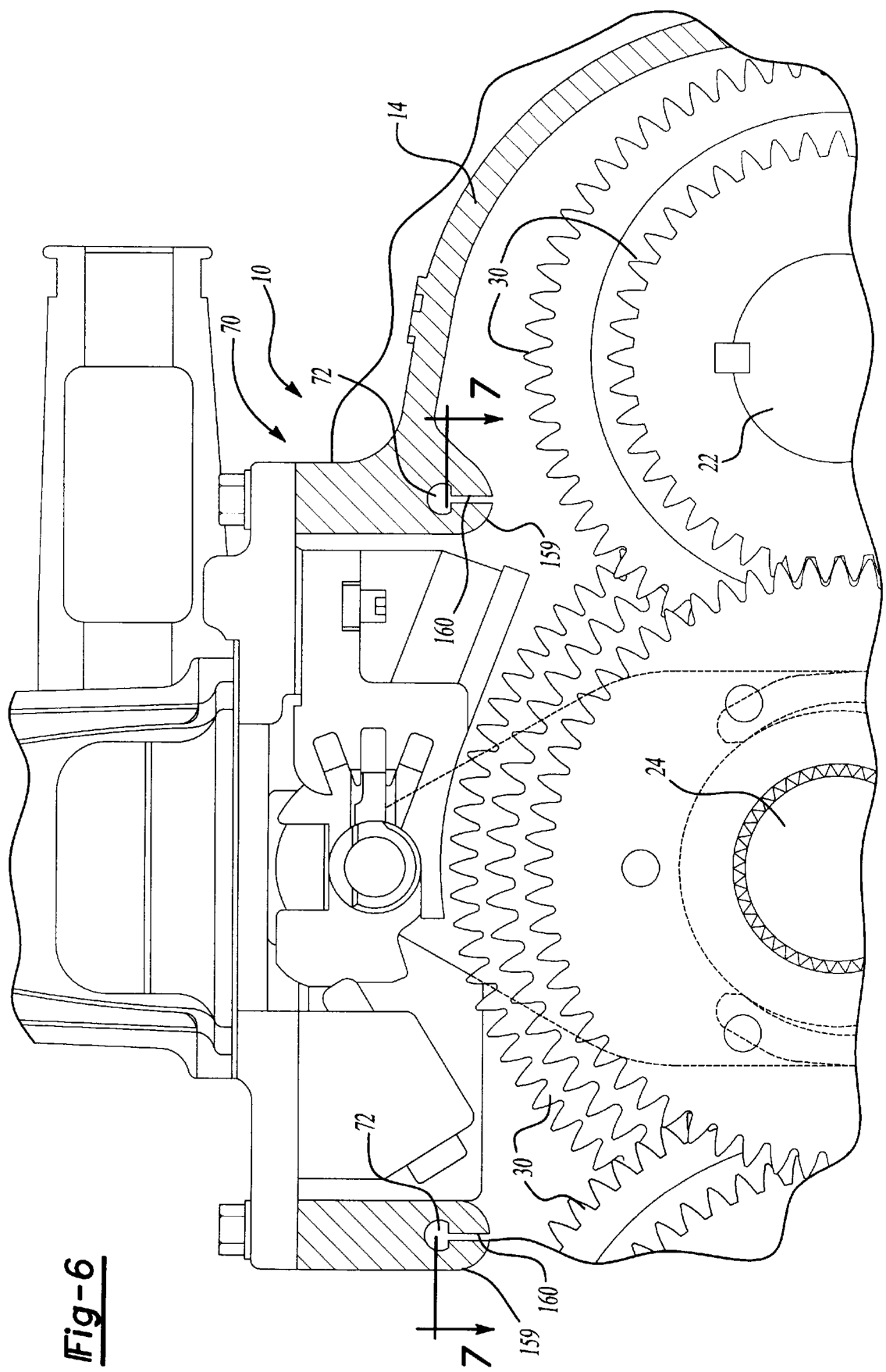
FIG. 6 is a partial cross-sectional view taken along line 6—6 in FIG. 1.
Figure 7:
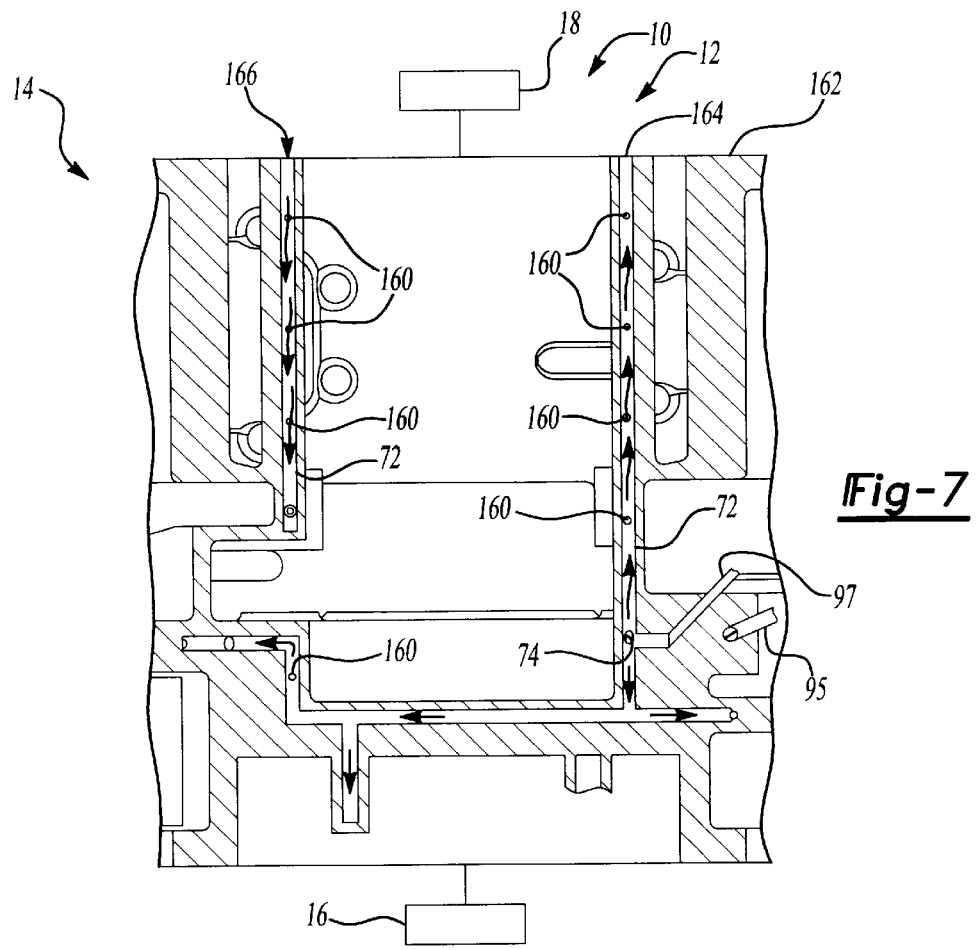
FIG. 7 is partial cross-sectional view taken along line 7—7 in FIG. 6.

As discussed above, the distribution system 44 carries oil to transmission components located throughout the housing 12. For example, the second passageway 72 lubricates the gears 30,31, in addition to lubricating the bearing portions 17. Referring to FIGS. 6 and 7, the second passageway 72 has at least one distribution port 160 proximate to the gears 30,31 for delivering the oil to the gears 30,31. To this end, the second passageway 72 is located in the upper portion 70 of the housing 12 above the gears 30,31. The distribution ports 160 are drilled through a surface 159 of the housing 12 and into the second passageway 72.

Figure 8:
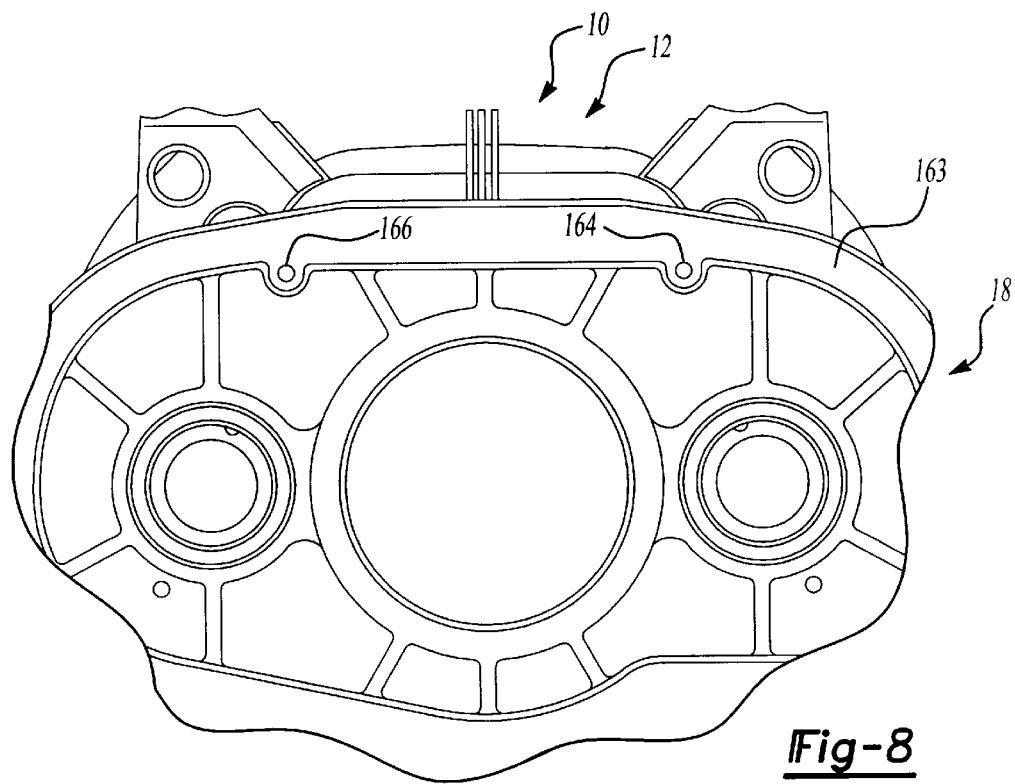
FIG. 8 is a cross-sectional view taken along line 8—8 in FIG. 1.

With reference to FIGS. 7 and 8, the main box 14 and clutch housing 18 each have a flange 162,163, respectively, that: abut one another when the main box 14 and clutch housing 18 are fastened together. The oil travels along the second passageway 72 parallel to the shafts 22,24 and into the clutch housing 18 through an inlet opening 164 at the interface of the flanges 162,163. The oil then travels through the oil distribution system within the clutch housing 18 (shown in FIGS. 9 and 10) and returns to the second passageway 72 in the main box 14 through outlet opening 166. The flanges 162,163 are sealed together using a high temperature liquid sealant.

Figure 9:
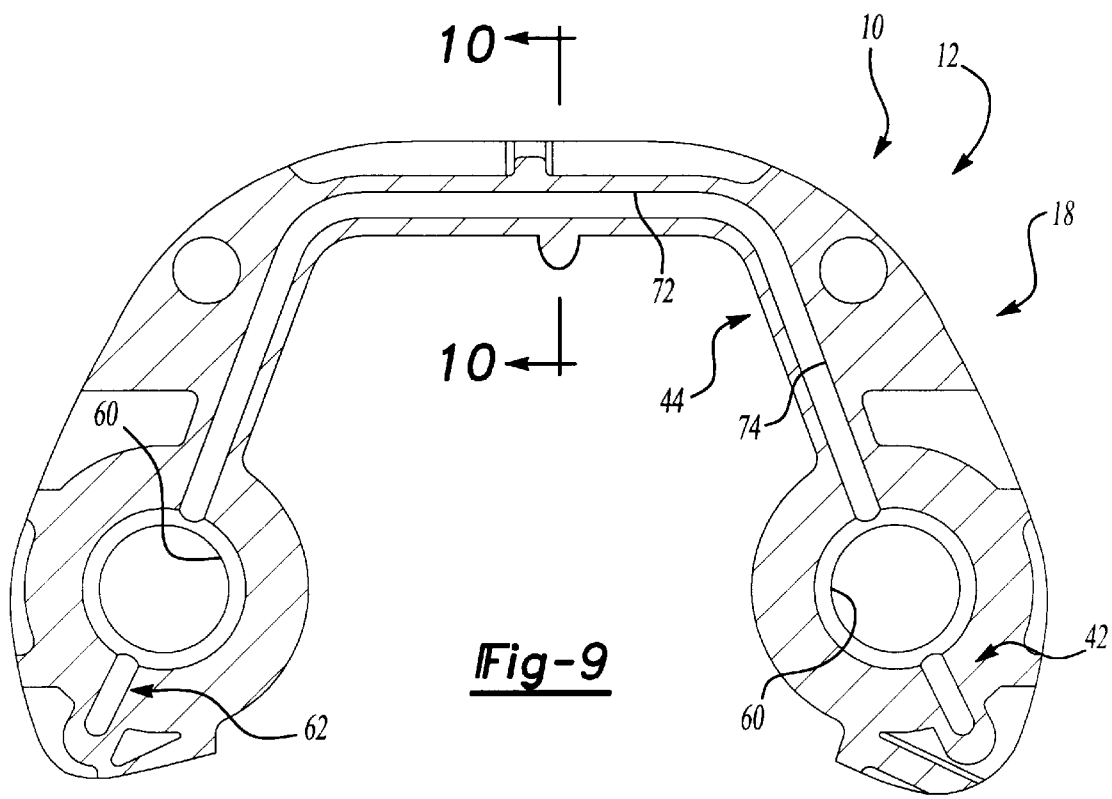
FIG. 9 is a cross-sectional view taken along line 9—9 in FIG. 1.
Figure 10:
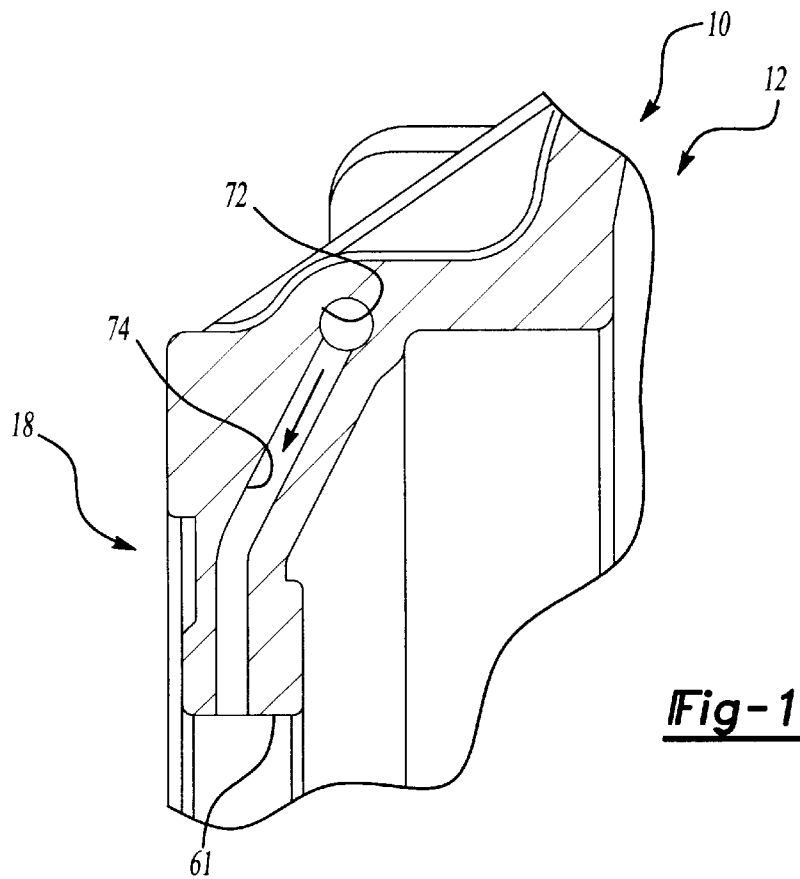
FIG. 10 is a cross-sectional view taken along line 10—10 in FIG. 9.

FIGS. 9 and 10 show front portions of the clutch housing 18 that deliver oil to the bearings 60 that support the bearing portions 17 of the shafts 22,24. The distribution system 44 has a second passageway 72 that carries the oil to a third passageway 74 that intersects the countershaft bores 60 to lubricate the bearing portion 17. Another third passageway 74 carries oil from the second passageway 72 to the input shaft bore 61, shown in FIG. 10. The oil is permitted to drain from the bore 60 to the sump 52 through return passageway 62.

Figure 11:
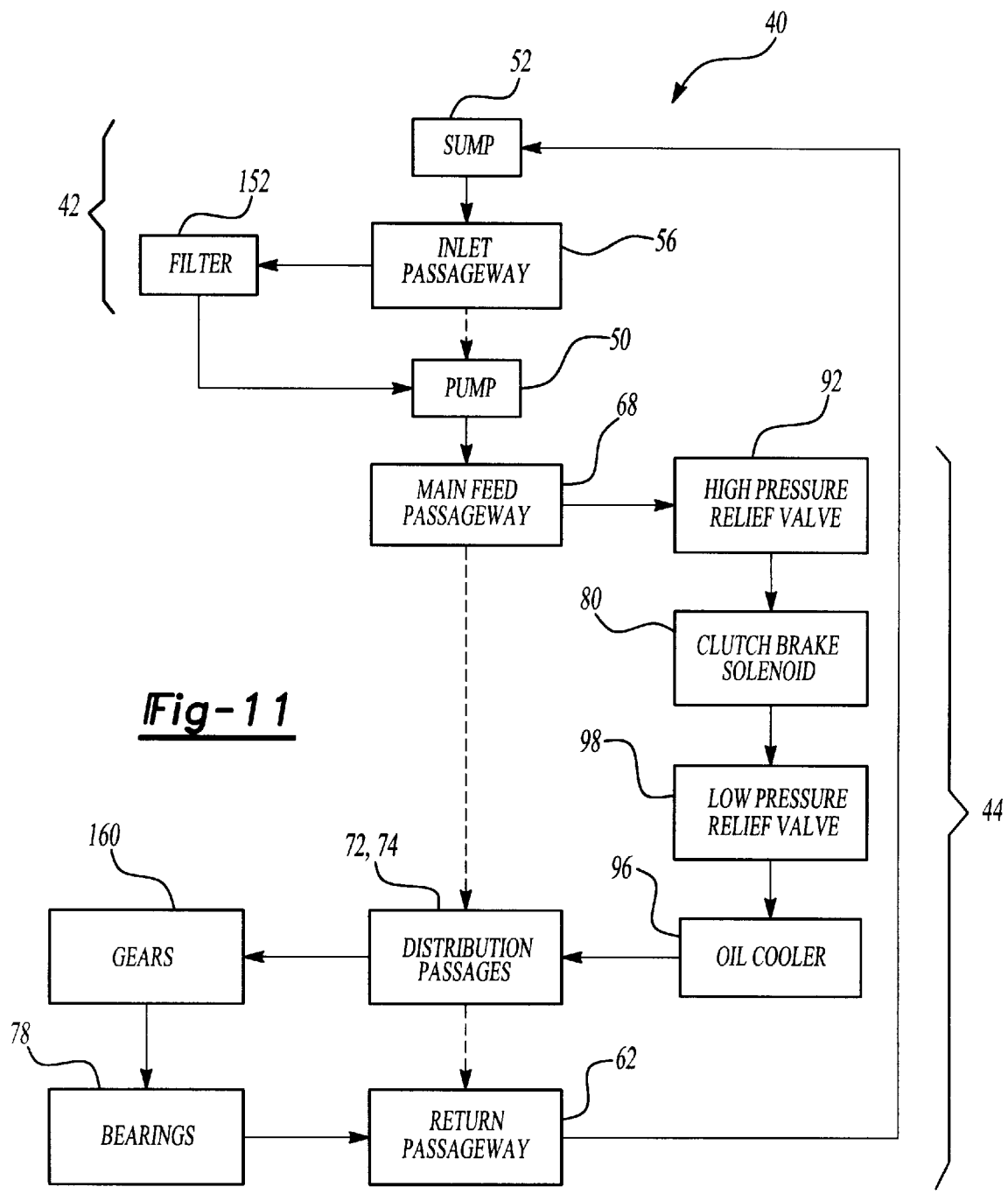
FIG. 11 is a schematic of the lubrication fluid flow path of the present invention lubrication system.

In operation, the pump assembly 50 pumps oil from the collection system 42 to the distribution system 44 to the transmission components, from which it returns to the collection system 42. FIG. 11 shows the flow of oil throughout the distribution system 40. The dashed lines indicate the oil flow path if some of the features of the present invention were not used. The pump assembly 50 draws the oil from the sump 52 through the plurality of branches 58 of the inlet passageway 56 and through the filter 152. The pump assembly 50 draws the oil from the inlet port 46 into the inlet chamber 128 and then expels the oil into the outlet chamber 130 and to the outlet port 48.

The pump assembly 50 then moves the oil through the main feed passageway 68 to the second 72 and third 74 passageways to deliver the oil to the gears 30,31 and bearing portions 17. The oil passe,, through the relief valves 92,98, solenoid 80 and oil cooler 96 as the oil travels through the second passageway 72.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A transmission having an integral lubrication system for delivering lubrication fluid comprising:

a housing having a sump portion for holding the fluid, said housing having a first portion with first and second surfaces in spaced relation;

a pump assembly having inlet and outlet chambers wherein said pump assembly moves the fluid from said inlet chamber to said outlet chamber;

a collection system having an inlet passageway interconnecting said inlet chamber and said sump to provide fluid communication therebetween;

a distribution system having a plurality of fluid distribution ports for delivering the fluid to a plurality of transmission components within said housing, said distribution system interconnecting said distribution ports and said outlet chamber to provide fluid communication therebetween, said distribution system having a first passageway with at least a portion interposed between said first and second surfaces;

at least one shaft supported by said housing, said at least one shaft collectively having a plurality of gears that cooperate to achieve a desired gear ratio, wherein said housing further includes a second portion having third and fourth surfaces in spaced relation, said distribution system having a second passageway interposed between said third and fourth surfaces, said second passageway having at least one of said distribution ports proximate to said plurality of gears for delivering the fluid to said plurality of gears;

at least one shaft has a bearing portion, wherein said housing further includes a third portion having fifth and sixth surfaces in spaced relation with at least one bore therethrough supporting said bearing portion, said distribution system having a third passageway interposed between said fifth and sixth surfaces, said third passageway having at least one of said distribution ports intersecting said at least one bore for delivering the fluid to said hearing portion; and said collection system further includes a return passageway interposed between said fifth and sixth surfaces, said return passageway intersecting said at least one bore and interconnecting said at least one bore and said sump to provide fluid communication therebetween for returning the fluid from said bearing portion to said sump.

2. A transmission having an integral lubrication system for delivering lubrication fluid comprising:

a housing having a sump portion for holding the fluid, said housing having a first portion with first and second surfaces in spaced relation;

a pump assembly having inlet and outlet chambers wherein said pump assembly moves the fluid from said inlet chamber to said outlet chamber;

a collection system having an inlet passageway interconnecting said inlet chamber and said sump to provide fluid communication therebetween;

a distribution system having a plurality of fluid distribution ports for delivering the fluid to a plurality of transmission components within said housing, said distribution system interconnecting said distribution ports and said outlet chamber to provide fluid communication therebetween, said distribution system having a first passageway with at least a portion interposed between said first and second surfaces;

at least one shaft supported by said housing, said at least one shaft collectively having a plurality of gears that cooperate to achieve a desired gear ratio, said plurality of gears being under a load, one of said plurality of gears being coupled to said pump assembly wherein said one of said plurality of gears drives said pump assembly;

a solenoid disposed within said first passageway between said outlet chamber and said distribution ports, said first passageway being under a pressure, said solenoid having a normally open and closed position in which said first passageway is unobstructed and blocked by said solenoid respectively; and a clutch signal connected to said solenoid for preparing the transmission to change between said plurality of gears, wherein said clutch signal actuates said solenoid to said closed position thereby increasing said pressure on said pump assembly and said load on said one of said plurality of gears.

3. The transmission as set forth in claim 2 further comprising:

a first pressure relief bore connected to said first passageway and in fluid communication therewith, said first pressure relief bore being positioned between said solenoid and said outlet chamber, said first pressure relief bore having a first venting orifice in fluid communication with said sump; and a first pressure relief valve disposed within said first pressure relief bore, said first pressure relief valve having a normally closed position and an open position in which said first venting orifice is blocked and unobstructed respectively, wherein said first pressure relief valves moves to said open position when said pressure exceeds a first predetermined pressure.

4. The transmission as set forth in claim 3 further comprising:

an oil cooler for interconnecting said solenoid and said distribution ports to provide fluid communication therebetween;

a second pressure relief bore connected to said first passageway and in fluid communication therewith, said second pressure relief bore being positioned between said solenoid and said oil cooler, said second pressure relief bore having a second venting orifice in fluid communication with, said sump; and a second pressure relief valve disposed within said second pressure relief bore, said second pressure relief valve having a normally closed position and an open position in which said second venting orifice is blocked and unobstructed respectively, wherein said second pressure relief valves moves to said open position when said pressure exceeds a second predetermined pressure.

5. The transmission as set forth in claim 4 wherein said first predetermined pressure is greater than said second predetermined pressure.

6. A transmission having an integral lubrication system for delivering lubrication fluid comprising:

a housing having a portion with opposing surfaces in spaced relation, said opposing surfaces having at least one bore therethrough;

a plurality of shafts having a bearing portion supported by said at least one bore, said plurality of shafts collectively having a plurality of gears that cooperate to achieve a desired gear ratio;

a pump assembly having inlet and outlet chambers wherein said pump assembly moves the fluid from said inlet chamber to said outlet chamber; and a collection system having a return passageway interposed between said opposing surfaces, said return passageway intersecting said at least one bore and interconnecting said at least one bore and said sump to provide fluid communication therebetween for returning the fluid from said bearing portion to said sump.

7. The transmission as set forth in claim 6 wherein a lost foam casting process forms said return passageway.

* * * * *